United States Patent Office 3,639,357
Patented Feb. 1, 1972

3,639,357
PROCESS FOR PREPARING SUBSTITUTED
MALEIMIDE POLYMERS
Hyman L. Cohen, Rochester, N.Y., assignor to Eastman
Kodak Company, Rochester, N.Y.
No Drawing. Filed Mar. 1, 1968, Ser. No. 709,793
Int. Cl. C08g 20/38
U.S. Cl. 260—78 UA                    5 Claims

ABSTRACT OF THE DISCLOSURE

Process for reacting a polymer containing units of a maleimide with a compound having a primary amine group. In one aspect polymers are produced thereby which are good dye mordants.

---

This invention relates to a novel method of preparing polymeric compounds. In one aspect this invention relates to novel methods for preparing polymers comprising units of substituted maleimides. In another aspect this invention relates to a new method for preparing dye mordanting compounds.

It is known to prepare substituted maleimide polymers by reacting a polymer comprising units derived from maleic anhydride with N,N-dialkylenediamines to obtain the corresponding polymer of maleamic acid which is then converted to the respective maleimide polymer by heating. However, the product formed is necessarily limited by reaction limitations of the parent interpolymer of maleic anhydride. Maleic anhydride generally will not copolymerize with other ethylenically unsaturated monomers in a greater ratio than 1:1. In many instances it is desirable to provide a substituted maleimide interpolymer having predominantly substituted maleimide units, especially in mordant applicants wherein the efficiency of the mordant is dependent on the number of substituted maleimide units present.

Therefore, it is an object of this invention to provide a new method of preparing polymers.

It is another object of this invention to provide a method for obtaining polymers comprising predominantly substituted maleimide units.

It is another object of this invention to provide a process for preparing homopolymers of substituted maleimides.

It is still another object to provide a process for preparing polymeric mordants.

We have now found that these and other objects of the invention are accomplished by reacting polymer comprising units of the formula

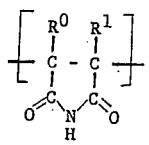

wherein $R^0$ and $R^1$ are hydrogen atoms or lower alkyl groups of 1 to 7 carbon atoms with a primary amine. The reaction is generally carried out in an inert atmosphere at temperatures of above 80° C. and preferably above 120° C. Typical primary amines which are useful in the process include benzylamine, aminoethanol, 4-aminobutraldehyde diethyl acetal, 2-hydroxyethylhydrazine, diethylaminopropylamine, N,N - dimethylpropylenediamine and the like. The resultant polymer can be used directly as a vehicle for photographic emulsions, a dye mordant for photographic elements, or it can be further reacted to convert it to an acid salt or a quaternary ammonium salt to provide exceptionally good dye mordants.

In a preferred embodiment the primary amine has the following formula:

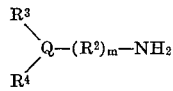

wherein $R^3$ and $R^4$ are each lower alkyl groups or they can together with Q to represent the atoms needed to form a substituted or unsubstituted, tertiary nitrogen-containing cyclic group such as 1-piperidino, 4-piperidino, morpholino, and the like; $R^2$ represents aminoalkylene (—R—NH—) group or a straight or branched chain alkylene group of 1 to 6 carbon atoms and preferably from 2 to 3 carbon atoms; $m$ is 0 or 1; and Q represents a nitrogen atom or the carbon radical

provided that when Q is said carbon radical, $R^3$ and $R^4$ taken together with Q represent a tertiary nitrogen-containing heterocyclic group and, further, $m$ can be 0 only when Q is said carbon radical. Typical preferred amines according to this formula which can be reacted with the maleimide type polymers include β-dimethylaminoethylamine, γ-diethylaminopropylamine, β-dipropylaminoethylamine, γ-dibutylaminopropylamine, N-methyl-N-ethylaminopropylamine, γ-piperidinopropylamine, β-morpholinoethylamine, etc.

The polymers containing maleimide units used in the reaction are well known in the art. Interpolymers having maleimide units are generally derived by polymerizing maleimide as a homopolymer or with at least one other ethylenically unsaturated monomer. Examples of copolymerizable monomers include monoethylenically unsaturated hydrocarbons such as ethylene, propylene, butene-1, isobutene, 2-methylpentene, di-isobutylene, styrene, α-methylstyrene; monoethylenically unsaturated esters of aliphatic acids such as vinyl acetate, isopropenyl acetate and allyl acetate; aliphatic esters of ethylenically unsaturated mono- or di-carboxylic acids such as methyl acrylate, methyl methacrylate, ethyl acrylate; monoethylenically unsaturated ethers, e.g., vinyl isobutyl ether; nitriles of monoethylenically unsaturated hydrocarbons such as acrylonitrile and allyl cyanide; and dienes such as butadiene and isoprene.

The preferred ethylenically unsaturated hydrocarbons are vinyl and vinylene groups containing hydrocarbons, esters and ethers. Particularly preferred vinyl hydrocarbons are 1-alkenes of 1 to 8 carbon atoms, 1,3-dienes of 4–8 carbon atoms and styrene while the esters are the acrylate esters. The preferred ethers are vinyl ethers such as vinyl methyl ether, vinyl ethyl ether, vinyl propyl ether, vinyl isopropyl ether, vinyl n-butyl ether, vinyl isobutyl ether and the isopropenyl homologues.

If desired, the polymeric maleimides may be polymerization products of mixtures of two or more of the imides with one or more of the other polymerizable unsaturated monomers, or alternatively two or more of the unsaturated monomers with one or more of the imides.

The polymeric imide reactant of the invention may vary considerably as to monomer constitution. Usually useful copolymeric maleimides may have an imide or derivative thereof to total monomer molar ratio of 1:6 to 6:1. However, in a preferred embodiment of this invention the polymeric imide reactant comprises predominantly units derived from a maleimide and preferably at least 60% of units derived from a maleimide monomer. The products derived from the preferred embodiment provides a higher concentration of mordanting sites than is normally achieved in related polymeric mordants.

The reaction of the polymers of maleimide with the primary amines of the invention is preferably carried out by stirring a mixture of the polymer with the amine at room temperature and then heating under an inert atmosphere for a time sufficient to achieve the desired degree of reaction. The heating can be conducted at temperatures of at least 80° C. to up to below the degradation temperature of the reactants and desired products but ordinarily is effected in the range of about 100 to 150° C. Reaction times and conditions will vary, of course, depending upon the specific reactants employed. For certain reactants, use of an inert reaction solvent may be desirable. Illustrative of suitable inert reaction solvents are dimethylsulfoxide, hexamethylphosphonamide, methyl Cellosolve, N-methylpyrrolidone, dimethylformamide, etc. The reactants need not be on an equimolar basis although generally it is advisable to use sufficient amine to insure reaction of at least 75% or 80% and preferably substantially all (i.e., 100%) of the imide units in the polymer. Recovery of the reaction product can be by conventional techniques as, for instance, by precipitation in a non-solvent.

The resulting polymers of this invention comprise units having the formula:

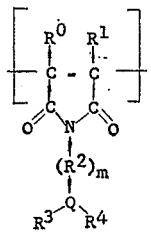

wherein $R^0$, $R^1$, $R^2$, $R^3$, $R^4$, $m$, and $Q$ are as above defined. The polymers are generally much lighter in color than the corresponding polymer derived through use of the maleic anhydride polymer.

Generally the polymers of this invention can be used for mordanting dyes in photographic emulsions in their acid salt form as disclosed in Minsk and Cohen, U.S. Patent 3,184,309 issued May 18, 1965, or can be further reacted as with the nitrogen-containing compounds disclosed therein to provide good mordants. They can also be quaternized to provide good mordants for use in a basic medium.

Polymers having the quaternized units are mordants which retain dyes much better under basic conditions than the acid salt of the corresponding unquaternized compounds. Conveniently, the quaternization can be effected by using an alkylating agent which can be represented by the structure $R^6X$ wherein $R^6$ is an aliphatic radical of from 1 to 4 carbon atoms, such as methyl, ethyl, propyl, butyl, and the like; X is a negative monovalent salt forming atom or radical such as monoalkyl sulfate, sulfonate, dialkyl phosphate, halide, etc. All of the units above can be quaternized or only a portion of them need be quaternized depending on the desired property of the mordant. The quaternization may be effected in a polar solvent such as water, dimethylformamide, dimethylsulfoxide, dimethylacetamide, or an alcohol such as methanol, ethanol, isopropanol, Cellosolve and the like. Generally, the quaternization is carried out to quaternize at least 50 percent of the tertiary nitrogen atoms attached to the said maleimide units. Temperatures from room temperature to 125° C. or more are generally used and if quaternization of only a part of the tertiary nitrogen atoms is desired, the amount of quaternizing agent may be reduced to correspond with the number of tertiary nitrogen atoms to be converted.

It is to be understood that certain of the quaternary compounds of this invention can be prepared by alternate procedures, for example, by the reaction of an N-(haloalkyl substituted)-maleimide interpolymer with a tertiary amine to provide the quaternized polymer. The maleimide interpolymer employed in this procedure can be obtained by the reaction of a haloalkylamine acetate salt with a maleic anhydride interpolymer in the manner described above for the preparation of the tertiary amine substituted interpolymers.

The polymers of this invention can be incorporated in water-permeable hydrophilic organic colloids or other polymeric binder materials and the resulting mixture used in the preparation of dye imbibition printing blanks and receiving layers for color transfer processes, such as those described in Rogers U.S. Patent 2,983,606 and Whitmore U.S. Patent 3,227,552 and U.S. Patent 3,227,550. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including polyvinyl alcohol derivatives, acrylamide polymers and the like. In addition to the hydrophilic colloids, the vehicle or binding agent can contain colloids such as dispersed polymerized vinyl compounds, particularly those which increase the dimensional stability of photographic materials. Suitable compounds of this type include water-insoluble polymers and copolymers of alkyl acrylates or methacrylates.

The concentration of polymers of this invention utilized in the water-permeable colloid can be varied, depending upon the particular polymer and its chemical characteristics. In general, the quantity of polymer should be at least 10 percent by weight, based on the weight of hydrophilic colloid. Larger amounts of polymer can be employed in the hydrophilic colloid layers and amounts as high as 50 percent by weight, based on the weight of the hydrophilic colloid can be used.

The polymeric mordants of this invention can be used for fixing the dyes, and particularly acid dyes, used in the preparation of photographic filter, antihalation or gelatin-silver halide emulsion layers. Such layers can be coated on conventional photographic supports, such as flexible sheet supports (e.g., cellulose acetate, polyester films, polyvinyl resins, etc.) or paper, glass, etc.

The invention can be further illustrated by the following examples of preferred embodiments thereof, although it will be understood that these examples are included merely for the purposes of illustration unless otherwise specifically indicated.

EXAMPLE 1

Preparation of poly(N-benzylmaleimide)

A mixture of 5 g. of poly(maleimide) and 70 ml. of benzylamine is heated in a 125° C. bath under nitrogen with stirring for 4 hours. The solution is cooled and poured into methanol. The precipitate is washed, vacuum dried and redissolved in acetone. It is again precipitated in methanol, washed and vacuum dried. Yield 5 g. of white solid.

*Analysis.*—Calcd. for $C_{11}H_9NO_2$ (percent): C, 70.6; H, 4.8; N, 7.5. Found (percent): C, 71.7; H, 5.7; N, 8.0.

EXAMPLE 2

Preparation of poly(N-hydroxyethylmaleimide)

A mixture of 5 g. of poly(maleimide) and 75 ml. of aminoethanol is heated with stirring for 4 hours in a 125° C. bath under nitrogen. The solution is cooled, precipitated in acetone, washed and vacuum dried. The product is dissolved in methanol, reprecipitated in acetone, washed and vacuum dried. Yield 4 g. of light pink solid soluble in water.

*Analysis.*—Calcd. for $C_6H_7NO_3$ (percent): C, 51.2; H, 5.0; N, 10.6. Found (percent): C, 50.7; H, 5.2; N, 11.5.

EXAMPLE 3

Preparation of poly[N-(4,4-diethoxybutyl)-maleimide]

A mixture of 5 g. of poly(maleimide) and 75 ml. of 4-aminobutraldehyde diethyl acetal is heated with stirring in a 125° C. bath under nitrogen for 4 hours. The solution is cooled, 100 ml. of hexamethylphosphoramide is added and the solution distilled under high vacuum to remove 100 ml. of distillate. The solution is precipitated in water, washed and vacuum dried. The solid is dissolved in methanol, precipitated in water, washed, and vacuum dried. Yield 3 g. soft solid.

EXAMPLE 4

Preparation of poly[N-(β-hydroxyethylamino)maleimide]

A mixture of 5 g. of poly(maleimide) and 70 ml. of 2-hydroxyethylhydrazine is heated in a 125° C. bath under nitrogen for 4 hours. The solution is cooled, precipitated in acetone, washed and vacuum dried. The solid is dissolved in methanol, precipitated in acetone, washed and vacuum dried. Yield 4 g. water-soluble product.

EXAMPLE 5

A mixture of 15 grams of maleimide homopolymer and 150 ml. of dimethylaminopropylamine is stirred in a 135° C. bath for three hours by which time a complete solution results. The solution is cooled, filtered, precipitated in petroleum ether, washed and vacuum dried. There is obtained a 17 gram yield of a substantially colorless product having an inherent viscosity in dimethylformamide of 0.22, and a molecular weight of approximately 40,000. Upon analytical calculation it is found that a substantial number of units in the polymer are $C_9H_{14}N_2O_2$ units.

*Analysis.*—Calcd. (percent): C, 59.5; H, 7.7; N, 15.4. Found (percent): C, 57.1; H, 8.9; N, 16.7.

By reducing the time of the reaction, the temperature or the concentration of the dimethylaminopropylamine in the mixture the percentage of $C_9H_{14}N_2O_2$ groups in the polymeric product can be decreased.

EXAMPLE 6

To a solution of 13 grams of the composition formed in Example 5 in 150 ml. dimethylformamide is added 30 grams of methyl p-toluenesulfonate. An exothermic reaction results. After standing for two days, the mixture is precipitated in acetone, washed, and vacuum dried. The product yield is 15 grams. Upon analytical calculation it is found that a substantial number of the units in the polymer were $C_{17}H_{24}N_2O_5S$ units.

*Analysis.*—Calcd. (percent): C, 56.6; H, 6.5; N, 7.6; S, 8.7. Found (percent): C, 54.7; H, 7.1; N, 8.0; S, 9.4.

EXAMPLE 7

A mixture of 3.1 grams of a copolymer of 0.5 mole of maleimide and 0.5 mole n-butyl vinyl ether and 60 ml. of N,N-dimethylpropylenediamine are tumbled at room temperature overnight to obtain a clear solution. This solution is then heated under nitrogen for three hours at 130° C. to obtain a dark blue solution. The latter solution is cooled and allowed to stand at room temperature for four days during which time the blue color changed to red. The product is isolated by precipitation in diethyl ether, collected, washed with ether, and dried. The product yields 2.5 grams of brown powder. Upon analytical calculations it is found that a substantial proportion of the maleimide units of the copolymer contained the N,N-dimethylpropylenediamine.

*Analysis.*—Calcd. for $C_{15}H_{26}N_2O_3$ (percent): C, 63.8; H, 9.2; N, 10.0. Found (percent): C, 62.3; H, 9.1; N, 10.2.

EXAMPLE 8

Copoly(styrene-maleimide) (1:1.58)

A solution of 5.2 g. (0.05 mole) of styrene, 9.7 g. (0.1 mole) of maleimide and 0.15 g. of azobis(isobutyronitrile) was heated in a 60° C. bath under nitrogen overnight. A precipitate began to form after 20 minutes. The next morning the supernatant liquid was decanted, the residue dissolved in dimethylformamide, the product precipitated in benzene, washed, and vacuum dried. The yield was 11 g. of white friable material.

*Analysis.*—Found (percent): C, 66.4; H, 5.2; N, 8.6.

Calculations based on the nitrogen analysis indicate that the polymer contains about 61.6 mole-percent maleimide units.

EXAMPLE 9

Copoly[styrene-N-(N',N'-dimethylaminopropyl)maleimide]

A mixture of 10 g. of the copoly(styreen-maleimide) prepared in Example 8 above and 100 ml. of dimethylaminopropylamine was tumbled in a bottle for two hours during which time complete solution resulted. The mixture was then heated for 2 hours in a 135° C. oil bath. To the mixture was added 150 ml. of dimethylformamide. While stirring, the oil bath temperature was increased to 160° C. and 120 ml. of distillate removed. The mixture was cooled, precipitated in diethyl ether, washed, and vacuum dried to yield 8 g. of fibrous material.

*Analysis.*—Found (percent): C, 66.8; H, 7.7; N, 11.3.

The invention has been described in detail with particular reference to certain preferred embodiments thereof, but it will be understood that variations and modifications can be effected within the spirit and scope of the invention.

I claim:

1. A process for preparing polymers containing N-substituted maleimide units which comprises reacting, at a temperature of at least 80° C. (1) a primary amine selected from the group consisting of benzylamine, amino ethanol, 4-aminobutraldehyde diethyl acetal, 2-hydroxyethylhydrazine and a compound of the formula:

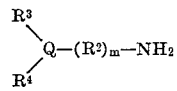

wherein $R^3$ and $R^4$ are each lower alkyl or together with Q represent the atoms necessary to form a tertiary nitrogen-containing cyclic group; $R^2$ is an aminoalkylene group or an alkylene group; $m$ is 0 or 1; and Q is a nitrogen atom or

provided that when Q is

$R^3$ and $R^4$ taken together with Q represent a tertiary nitrogen-containing heterocyclic group and provided $m$ is 0 only when Q is

with (2) N-unsubstituted maleimide units in a polymer containing such units, in a ratio range of N-unsubstituted maleimide units to other units of from between 1 to zero and 1 to 6, said N-unsubstituted maleimide units having the formula:

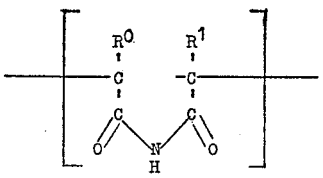

where each of $R^0$ and $R^1$ is hydrogen or an alkyl group, to produce a solid polymer in which at least 75 percent of the said N-unsubstituted maleimide units have reacted with the said primary amine.

2. A process according to claim 1 wherein said reaction is carried out in an inert atmosphere.

3. A process according to claim 1 wherein said polymer comprises predominantly N-unsubstituted maleimide units represented by said formula.

4. A process according to claim 1 wherein said polymer comprises units of said formula in copolymerized relationship with units of styrene.

5. A process according to claim 1 wherein said primary amine is diethylaminopropylamine.

References Cited

UNITED STATES PATENTS

| | | | |
|---|---|---|---|
| 2,650,215 | 8/1953 | Strain | 260—78 |
| 3,157,595 | 11/1964 | Johnson et al. | 260—78 |
| 3,297,654 | 1/1967 | Barr et al. | 260—78 |

HAROLD D. ANDERSON, Primary Examiner

U.S. Cl. X.R.

96—57, 84 A; 260—8 R, 17.4 R, 874 R

PO-1050
(5/69)

UNITED STATES PATENT OFFICE
CERTIFICATE OF CORRECTION

Patent No. 3,639,357  Dated February 1, 1972

Inventor(s) Hyman L. Cohen

It is certified that error appears in the above-identified patent and that said Letters Patent are hereby corrected as shown below:

Column 6, line 51, " -HH " should read --- -CH ---.

Signed and sealed this 11th day of July 1972.

(SEAL)
Attest:

EDWARD M. FLETCHER, JR.　　　　　　　ROBERT GOTTSCHALK
Attesting Officer　　　　　　　　　　Commissioner of Patents